US009087424B2

(12) United States Patent
Stoeckli et al.

(10) Patent No.: US 9,087,424 B2
(45) Date of Patent: Jul. 21, 2015

(54) METHOD AND DEVICE FOR CHECKING THE DEGREE OF SOILING OF BANK NOTES

(75) Inventors: Armin Stoeckli, Ittigen (CH); Reto Schletti, Burgdorf (CH)

(73) Assignee: Beb Industrie-Elektronik AG (CH)

( * ) Notice: Subject to any disclaimer, the term of this patent is extended or adjusted under 35 U.S.C. 154(b) by 395 days.

(21) Appl. No.: 13/497,381

(22) PCT Filed: Aug. 20, 2010

(86) PCT No.: PCT/EP2010/005125
§ 371 (c)(1),
(2), (4) Date: Mar. 21, 2012

(87) PCT Pub. No.: WO2011/038809
PCT Pub. Date: Apr. 7, 2011

(65) Prior Publication Data

US 2012/0176605 A1 Jul. 12, 2012

(30) Foreign Application Priority Data

Oct. 2, 2009 (DE) ......................... 10 2009 048 002

(51) Int. Cl.

| | |
|---|---|
| ***G06K 9/74*** | (2006.01) |
| ***G01B 9/08*** | (2006.01) |
| ***G07D 7/12*** | (2006.01) |
| ***G07D 7/18*** | (2006.01) |

(52) U.S. Cl.
CPC ................ *G07D 7/122* (2013.01); *G07D 7/187* (2013.01)

(58) Field of Classification Search
CPC ....... G07D 7/121; G07D 7/187; G07D 7/122; G01N 21/86; G01N 21/94
USPC .................................................... 356/71, 392
See application file for complete search history.

(56) References Cited

U.S. PATENT DOCUMENTS

| | | | | |
|---|---|---|---|---|
| 6,101,266 | A | 8/2000 | Laskowski et al. | |
| 7,743,523 | B2 | 6/2010 | Schletti et al. | |
| 2004/0051862 | A1* | 3/2004 | Alcock et al. | 356/71 |
| 2006/0001880 | A1 | 1/2006 | Stober | |
| 2006/0140468 | A1 | 6/2006 | Holl | |
| 2009/0245590 | A1 | 10/2009 | Holl et al. | |
| 2011/0273191 | A1 | 11/2011 | Dahler et al. | |
| 2011/0273717 | A1 | 11/2011 | Reinhard et al. | |

FOREIGN PATENT DOCUMENTS

| | | | |
|---|---|---|---|
| DE | 10234084 | A1 | 2/2004 |
| DE | 102006053788 | A1 | 5/2008 |
| EP | 1429297 | A1 | 6/2004 |
| GB | 2366371 | A | 3/2002 |
| WO | WO-2004027718 | A1 | 4/2004 |

OTHER PUBLICATIONS

English Translation of International Preliminary Report on Paentability for PCT/EP2010/005125 (Apr. 19, 2012).
International Search Report (in English) for PCT/EP2010/005125, mailed Nov. 19, 2010; ISA/EP.
German Search Report (in German) for German Application No. 10 2009 048 002.1, dated Nov. 24, 2009.

* cited by examiner

*Primary Examiner* — Kara E Geisel
*Assistant Examiner* — Hina F Ayub
(74) *Attorney, Agent, or Firm* — Harness, Dickey & Pierce, P.L.C.

(57) ABSTRACT

The invention relates to a method and device for checking the degree of soiling of bank notes. To this end, the bank notes are conveyed along a transport path and illuminated by at least one light source with visible light of the blue spectral range. The light reflected and/or emitted by the bank notes, and/or the light having penetrated the bank notes due to transmission, is detected by means of at least one sensor and evaluated.

15 Claims, 1 Drawing Sheet

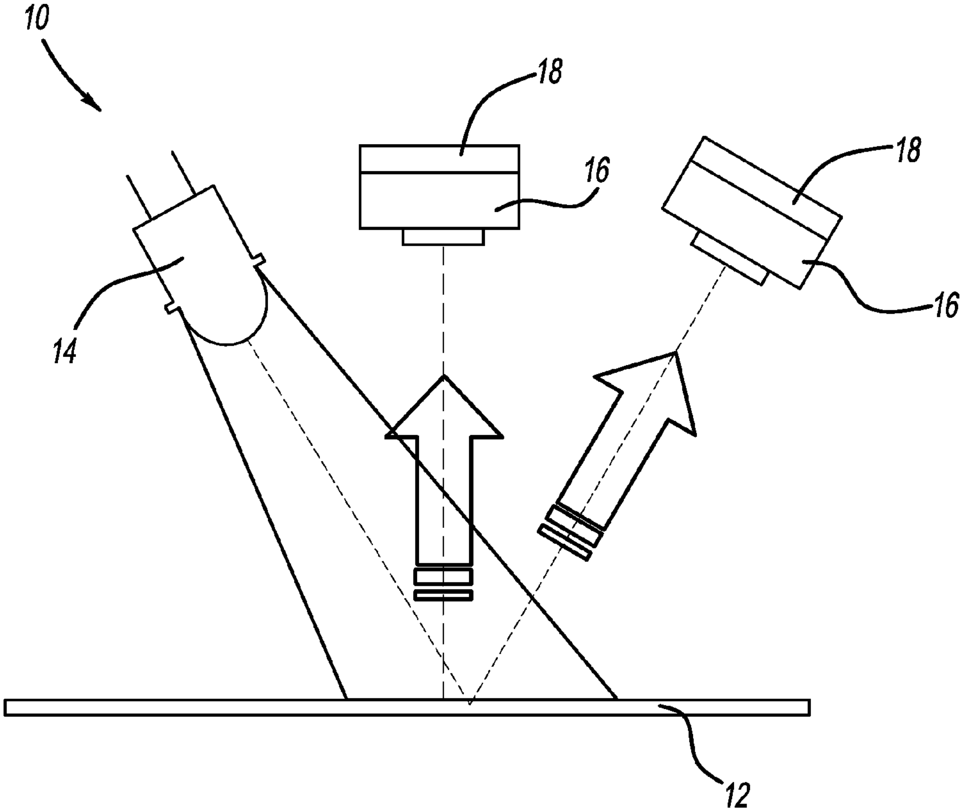
10
18
16
18
14
16
12

METHOD AND DEVICE FOR CHECKING THE DEGREE OF SOILING OF BANK NOTES

CROSS-REFERENCE TO RELATED APPLICATIONS

This application is a National Stage of International Application No. PCT/EP2010/005125, filed Aug. 20, 2010, and published in German as WO 2011/038809 A1 on Apr. 7, 2011. This application claims the benefit and priority of German Application 10 2009 048 002.1, filed Oct. 2, 2009. The entire disclosures of the above applications are incorporated herein by reference.

BACKGROUND

This section provides background information related to the present disclosure which is not necessarily prior art.

TECHNICAL FIELD

The invention relates to a method and a device for checking the degree of soiling of bank notes.

DISCUSSION

Methods and devices of this kind are employed to detect and separate soiled bank notes from a quantity of bank notes. Bank notes that are of poor quality because of wear or damage inhibit monetary transactions and render the detection of security features more difficult. Manifestations of wear and damage include soiling, tears, lack of stiffness, holes, stains, edges torn off or bent, folds and adhesive tape used for repair. Damaged or compromised bank notes of this nature are separated on a regular basis. This is preferably done during automated processing of bank notes, for example when inspecting, verifying or counting bank notes. The bank notes are usually illuminated by at least one light source to detect soiling and damage while they are being transported. The light reflected and/or emitted by the bank notes and/or the transmission of light through the bank notes is detected using optical sensors. The degree of soiling is then determined from the evaluation of the light detected by the sensors. Other types of wear or damage can be checked in the same or another way. To check soiling, for example, the optical density of bank notes can be determined from the light detected by the sensors. If said density exceeds a specified threshold value, severe soiling is indicated. The threshold values for the various bank notes are specified. For example, the European Central Bank specifies threshold values for the optical density of various denominations of euro bank notes when irradiated by light of different wave lengths. These threshold values are also known as ECB soiling thresholds. For example, the threshold value for the optical density of the 500-euro note, the 50-euro note and the 10-euro note are specified when irradiated by light having a wavelength between 500 and 560 nm. For the 200-euro note, the threshold value for optical density is specified under light having a wavelength between 410 and 450 nm. For denominations of 100, 20 and 5 euros, the threshold value for optical density is set between 590 and 650 nm. These wavelength ranges are related to the inks with which the bank notes are printed.

The problem associated with this process is that the optical density of soiled, and even of heavily soiled, bank notes can lie below the specified threshold value when irradiated with light within the specified wavelength range, and thus it is not possible to detect and separate soiled banknotes with any degree of reliability.

SUMMARY OF THE INVENTION

An object of the invention is to provide a method and a device for checking the degree of soiling of bank notes that makes it possible to check the degree of soiling in a reliable manner using light in a wavelength range common to all denominations of bank notes.

One feature of the method is that the bank notes to be checked are illuminated with visible light in the blue wavelength range. The wavelength of the light lies in the range between 380 and 480 nm. At least one optical sensor detects the light following its interaction with a bank note. An interaction between the light and the bank note ensues in the form of reflection, transmission or emission because of luminescence.

The intensity or the optical density for evaluation can be determined from the light detected by means of the optical sensor. Soiling of bank notes causes an increase in optical density compared with new bank notes and a reduction in the reflection of light on the surface of the bank notes. Advantageously, when irradiated with blue light, greater differences show up in the intensity and the optical density of both new and clean bank notes on the one hand as well as soiled bank notes than when they are irradiated by light of different wavelengths. This applies to bank notes of different nominal values and denominations. In this way, it is possible to detect soiled bank notes reliably, irrespective of their nominal value.

The bank notes are preferably being transported when the method is put into practice. The light source and the sensor are arranged to be stationary. Because of the relative motion between a bank note being transported and the stationary light source and the sensor, the bank note is scanned in the transport direction. Regarding the sensor, it can be a line sensor or a line camera. The length of the line is adjusted to the dimension of the bank notes measured perpendicular to the direction of transport. Line sensors of this kind permit scanning of the bank notes over the entire surface facing the line sensors. In addition, what are known as trace sensors can be employed. They have only one or only a few image spots and allow lateral scanning only in a narrow range. Since soiling involves contamination over a broad area, the use of a trace sensor may be sufficient.

A further distinction is made in the case of the sensors between incident light sensors and transmitted light sensors. When incident light sensors are used, the light source and the sensor are located on the same side of the transport route of the bank note. These sensors provide evidence of reflections and possibly also luminescence. When transmitted light sensors are used, the sensor is located on the side of the bank note transport route facing away from the light source. Transmitted light sensors are suitable for establishing transmission. The light sources can be arranged on only one side of the transport route or on both sides of the transport route. In similar fashion, the sensors can be arranged on only one side or on both sides of the transport route.

In an advantageous manner, only the light reflected and/or emitted from the unprinted areas of a bank note and/or the light penetrating through the unprinted areas because of transmission can be used for evaluation. Since these areas are identical, or at least approximately identical, for all bank notes of one currency, the values established for new bank notes are identical or very similar when evaluating the light in these areas. The threshold value for a soiled bank note can thus be specified irrespective of the denomination.

DRAWING

The drawing described herein is for illustrative purposes only of select embodiments and not all possible implementations, and is not intended to limit the scope of the present disclosure.

FIG. 1 illustrates a device according to the present teachings for checking bank notes for their degree of soiling.

Corresponding reference numerals indicate corresponding parts throughout the several views of the drawing.

DETAILED DESCRIPTION OF THE PREFERRED EMBODIMENTS

In accordance with an advantageous embodiment of the invention, the bank notes are illuminated using pulsed light. In this case, it is possible to achieve timed resolution of the scanning.

In accordance with a further advantageous embodiment of the invention, the bank notes are illuminated using pulsed light in other wavelength ranges. The light pulses are phase offset to each other. They are emitted in a time sequence from different light sources. Through the combination of measurements in the blue spectral range with other color channels, wave-length independent and/or configuration-independent effects can be evaluated and used to detect soiling or additional characteristics as needed. In addition to blue, infrared, red, and green are among the different wavelength ranges. In addition to the different colors, either only the reflection, only the transmission or only the emission can be determined. Furthermore, the option exists in the case of other colors of determining only the reflection and with a last color of determining only the emission. Different effects can thereby be examined and used to check the degree of soiling.

In accordance with a further advantageous embodiment of the invention, the sequence of light pulses is sequenced irregularly. For example, the sequence in a first cycle can be green, red, then blue. In a second cycle the blue light pulse is replaced by an infrared light pulse. The infrared light pulse is replaced in a third cycle by an ultraviolet light pulse. The fourth cycle then corresponds again to the first cycle. Repetition of the blue light pulse can occur only every second, third or fourth cycle using short cycles and a relatively slow transport speed for the bank notes. In particular when only the unprinted areas of a bank note are used for checking and said areas are large, low spatial resolution and thus a low repetition rate for the blue light pulses are adequate.

In accordance with a further advantageous embodiment of the invention, only the light reflected, transmitted and/or emitted from unprinted areas of a banknote is evaluated following detection. The bank notes of one currency are identical with respect to these areas. Checking the degree of soiling of the bank notes using monochromatic blue light is rendered easier. In this case the threshold value can be the same for all denominations of the bank notes.

With reference to FIG. 1, for example, the device 10 from the invention for checking bank notes 12 for their degree of soiling is equipped with at least one light source 14 that illuminates the bank notes 12 with light in the blue spectral range. The light source 14 may be a light-emitting diode LED that radiates blue light. The further option exists of using a light source that emits white light and of combining this light source with a colored filter. The device 10 is additionally equipped with at least one sensor 16 that detects the light reflected and/or transmitted and/or emitted by the bank notes. This sensor 16 may be a trace sensor or a line sensor. One or several photo diodes are suitable for use as a trace sensor. Other types of light-sensitive sensors may also be considered. A contact image sensor (also known as a CIS Contact Image Sensor) may also be used as a line camera. The two-dimensional resolution is achieved by transporting the bank notes 12 relative to the sensor 16. The contact image sensor requires almost direct contact with the bank notes 12. High depth of field and long-term stability of the sensor 16 are more important than lateral resolution when inspecting bank notes for soiling. Depth of field is important because the bank notes 12 may be at different distances from the sensor 16 as they are being transported. Long-term stability for the sensor 16 is also of great importance because the measured values are being compared with a specified threshold value. This measurement must be reproducible.

The sensor 16 can be combined with other sensors in a device to inspect bank notes 12. It is furthermore possible to use existing sensors to test other features of a bank note in order to check the degree of soiling. To this end, a special evaluation of the measured values detected by the sensors is performed.

The device has in addition an evaluation apparatus 18 that evaluates the light detected by the sensor 16. The measured values are compared directly with specified threshold values, or a physical quantity is calculated from the measured values, and said quantity is compared with a specified threshold value.

In accordance with a further advantageous embodiment of the invention, the light from the light source 14 has a wavelength between 380 and 460 nm. Particularly advantageously, the light has a wavelength between 420 and 460 nm. With new euro bank notes at least, no differences in optical density are found in this wavelength range as the result of different papers or different paper contents.

In accordance with a further advantageous embodiment of the invention, the sensor is a transmitted light sensor. Said sensor is arranged on the side of the transport route facing away from the light source. The sensor is used to detect the transmission of the light passing through the bank notes.

In accordance with a further advantageous embodiment of the invention, the sensor is an incident light sensor. Said sensor is arranged on the same side of the transport section as the light source. The sensor is used to detect the light reflected from the bank notes.

All features of the invention may be essential to the invention, both individually and in any combination with each other.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for checking the degree of soiling of bank notes, comprising:

transporting the bank notes along a transport path, illuminating the bank notes with sequences of pulses of light of different wavelengths, wherein at least one of the sequences includes visible light in the blue spectral range, detecting the light reflected and/or emitted by the bank notes and/or the light passing through the bank notes by reason of transmission, evaluating the light detected; and wherein the sequence of light pulses is irregular in its order.

2. The method according to claim 1, wherein the bank notes are illuminated with light in a wavelength between 420 nm and 480 nm.

3. The method according to claim 1, wherein the optical density is determined during the evaluation of the detected light.

4. The method according to claim 1 wherein the bank notes are additionally illuminated using pulsed light from other wavelength ranges, wherein the light pulses are emitted from different light sources timed to be offset to each other in a chronological sequence.

5. The method according to claim 1, wherein only the light reflected and/or emitted from unprinted areas of a bank note and/or the light passing through unprinted areas of a bank note by reason of transmission is evaluated following detection.

6. A device for checking banknotes for their degree of soiling comprising, according to claim 1, at least one light source is configured to illuminate the bank notes with light in the blue spectral range, at least one sensor is configured to detect the light reflected and/or transmitted and/or emitted by the bank not, and an evaluation apparatus is configured to evaluate the light detected by the sensor.

7. The device according to claim 6, wherein the light source is configured to include at least one light-emitting diode.

8. The device according to claim 6, wherein the light from the light source is configured to have a wavelength between 380 and 460 nm.

9. The device according to claim 8, wherein the light from the light source is configured to have a wavelength between 420 and 460 nm.

10. The device according to claim 6, wherein the sensor is configured to be a transmitted light sensor.

11. The device according to claim 6, wherein the sensor is configured to be an incident light sensor.

12. The device according to claim 6, wherein the sensor is configured to be a trace sensor.

13. The device according to claim 6, wherein the sensor is configured to be a line sensor.

14. A method for checking the degree of soiling of bank notes, comprising:

transporting the bank notes along a transport path, illuminating the bank notes with sequences of pulses of light of different wavelengths, successive sequences being irregular such that the order of the pulses of the different wavelengths is different between successive sequences, detecting the light reflected and/or emitted by the bank notes and/or the light passing through the bank notes by reason of transmission, and evaluating the light detected.

15. The method according to claim 1, wherein one of the pulses is blue light in a wavelength between 420 nm and 480 nm.

* * * * *